US011070389B2

(12) United States Patent
Schuster et al.

(10) Patent No.: US 11,070,389 B2
(45) Date of Patent: Jul. 20, 2021

(54) BUILDING MANAGEMENT SYSTEM WITH AUTOMATED VIBRATION DATA ANALYSIS

(71) Applicant: Johnson Controls Technology Company, Auburn Hills, MI (US)

(72) Inventors: Kelsey Carle Schuster, Wauwatosa, WI (US); Youngchoon Park, Brookfield, WI (US); Sudhi R. Sinha, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/993,331

(22) Filed: May 30, 2018

(65) Prior Publication Data

US 2019/0123931 A1    Apr. 25, 2019

Related U.S. Application Data

(60) Provisional application No. 62/575,619, filed on Oct. 23, 2017.

(51) Int. Cl.
*G05B 15/02*    (2006.01)
*G06N 20/00*    (2019.01)
(Continued)

(52) U.S. Cl.
CPC ...... *H04L 12/2816* (2013.01); *G05B 13/0265* (2013.01); *G05B 15/02* (2013.01);
(Continued)

(58) Field of Classification Search
CPC ............ G05B 23/0283; G05B 13/0285; G05B 13/024; G05B 23/0229; G05B 23/0232; G05B 23/024; G05B 23/0243; G05B 19/4184; G05B 19/41875; G05B 2219/31467; G05B 2219/33303;
(Continued)

(56) References Cited

U.S. PATENT DOCUMENTS 5,566,092 A * 10/1996 Wang ................. G05B 19/4184
700/159
5,602,761 A * 2/1997 Spoerre ................. G01H 1/003
702/179
(Continued)

OTHER PUBLICATIONS

Search Report for International Application No. PCT/US2018/035181, dated Oct. 9, 2018, 19 pages.

*Primary Examiner* — Darrin D Dunn
(74) *Attorney, Agent, or Firm* — Foley & Lardner LLP

(57) ABSTRACT

A method performed by a Building Management System (BMS) includes receiving a vibration dataset associated with a machine controlled by the BMS. The vibration dataset includes machine metadata, machine operating conditions, and one or more time waveforms. The method further includes assembling a feature vector comprising one or more features of the vibration dataset for input to a machine learning model. The machine learning model is associated with a component of the machine. The method further includes applying the feature vector to the machine learning model in order to generate a condition score for the component. The method further includes scheduling a maintenance event for the machine or changing a setpoint associated with the machine depending on the condition score.

25 Claims, 8 Drawing Sheets

(51) Int. Cl.
*G05B 13/02* (2006.01)
*G05B 23/02* (2006.01)
*H04L 12/28* (2006.01)

(52) U.S. Cl.
CPC ..... *G05B 23/0283* (2013.01); *G05B 23/0286* (2013.01); *G06N 20/00* (2019.01)

(58) Field of Classification Search
CPC ...... G05B 2219/34065; G05B 23/0208; G01H 1/003; G01M 13/045; G01M 13/00; G01M 13/028; G01M 15/14; G01N 29/46; G01N 2291/2693; G01N 29/12
See application file for complete search history.

(56) References Cited

U.S. PATENT DOCUMENTS

| | | | | |
|---|---|---|---|---|
| 5,748,508 | A * | 5/1998 | Baleanu | G01H 1/003 700/31 |
| 7,027,953 | B2 * | 4/2006 | Klein | G01H 1/006 702/182 |
| 8,781,982 | B1 * | 7/2014 | Das | G06E 1/00 706/21 |
| 9,729,639 | B2 * | 8/2017 | Sustaeta | G05B 13/0285 |
| 9,835,594 | B2 | 12/2017 | Yoskovitz et al. | |
| 10,120,374 | B2 * | 11/2018 | Hosek | G06F 11/2257 |
| 2003/0074159 | A1 * | 4/2003 | Bechhoefer | G01H 1/003 702/181 |
| 2005/0033557 | A1 * | 2/2005 | House | G05B 23/0283 702/184 |
| 2005/0160749 | A1 * | 7/2005 | Shaffer | F04D 27/0246 62/228.1 |
| 2005/0209814 | A1 * | 9/2005 | Song | G01P 3/44 702/145 |
| 2006/0089744 | A1 * | 4/2006 | Jalluri | G05B 19/4065 700/174 |
| 2007/0032966 | A1 * | 2/2007 | Song | G05B 23/0221 702/35 |
| 2007/0088550 | A1 * | 4/2007 | Filev | G05B 23/0221 704/245 |
| 2008/0106424 | A1 * | 5/2008 | Bouse | G05B 19/4065 340/635 |
| 2009/0204267 | A1 * | 8/2009 | Sustaeta | G05B 13/0285 700/291 |
| 2010/0023307 | A1 * | 1/2010 | Lee | G05B 23/0254 703/7 |
| 2011/0257901 | A1 * | 10/2011 | Bechhoefer | G01H 1/00 702/34 |
| 2014/0116124 | A1 * | 5/2014 | Ma | G05B 23/0232 73/112.01 |
| 2015/0262060 | A1 * | 9/2015 | Husain | G06N 3/08 706/21 |
| 2016/0041070 | A1 * | 2/2016 | Wascat | G05B 23/024 702/183 |
| 2016/0238438 | A1 * | 8/2016 | Chen | G01M 5/0033 |
| 2016/0364313 | A1 * | 12/2016 | Roth | G06F 11/3062 |
| 2017/0024649 | A1 * | 1/2017 | Yan | G06N 3/0454 |
| 2017/0067860 | A1 * | 3/2017 | Grabill | G01P 3/481 |
| 2017/0102695 | A1 | 4/2017 | Hilemon et al. | |
| 2017/0178030 | A1 * | 6/2017 | Pal | G06F 17/5009 |
| 2017/0178311 | A1 * | 6/2017 | Pal | H04W 4/80 |
| 2017/0315516 | A1 * | 11/2017 | Kozionov | G01H 1/003 |
| 2017/0359418 | A1 * | 12/2017 | Sustaeta | G05B 13/0285 |
| 2018/0046902 | A1 * | 2/2018 | Liao | G06N 3/088 |
| 2018/0058463 | A1 * | 3/2018 | Rollins | F04D 25/0606 |
| 2018/0059745 | A1 * | 3/2018 | Gross | G06F 1/206 |
| 2018/0068323 | A1 * | 3/2018 | Stratton | G06Q 30/0201 |
| 2018/0175762 | A1 * | 6/2018 | Yu | H02P 6/17 |
| 2018/0347843 | A1 * | 12/2018 | Friedenberger | F24F 11/38 |
| 2018/0356140 | A1 * | 12/2018 | Subramaniam | F25B 49/025 |
| 2019/0079506 | A1 * | 3/2019 | Hubauer | G05B 23/0208 |
| 2019/0101436 | A1 * | 4/2019 | Li | H02K 11/21 |
| 2019/0102492 | A1 * | 4/2019 | Majewski | G06F 17/5009 |
| 2019/0197238 | A1 * | 6/2019 | Canedo | G06F 21/554 |

* cited by examiner

BUILDING MANAGEMENT SYSTEM WITH AUTOMATED VIBRATION DATA ANALYSIS

CROSS-REFERENCE TO RELATED PATENT APPLICATION

This application claims the benefit of and priority to U.S. Provisional Application No. 62/575,619 filed Oct. 23, 2017, the entire disclosure of which is incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

A BMS can collect and monitor data from sensors and other types of building equipment. This data can be used for maintenance and repairs of equipment, analyze equipment performance, etc. Many previous approaches to management of this data involved storing the data in a database and loading it in response to a query.

SUMMARY

One implementation of the present disclosure is a method performed by a BMS. The method includes receiving a vibration dataset associated with a machine controlled by the BMS. The vibration dataset includes machine metadata, machine operating conditions, and one or more time waveforms. The method further includes assembling a feature vector comprising one or more features of the vibration dataset for input to a machine learning model. The machine learning model is associated with a component of the machine. The method further includes applying the feature vector to the machine learning model in order to generate a condition score for the component. The method further includes scheduling a maintenance event for the machine or changing a setpoint associated with the machine depending on the condition score.

In some embodiments, each of the time waveforms is associated with a physical point on the machine.

In some embodiments, the method further includes calculating a fast Fourier transform (FFT) of each of the time waveforms.

In some embodiments, the method further includes calculating a machine speed based on frequency domain information obtained from the FFT.

In some embodiments, the component is a motor shaft, a bearing, or a fan.

In some embodiments, the machine is a chiller, a boiler, an air handling unit (AHU), or a variable air volume (VAV) unit.

In some embodiments, vibration data contained in the vibration dataset is collected using a triaxial accelerometer.

In some embodiments, the machine metadata includes a machine type, a machine model, a gear ratio, or a location of the machine.

In some embodiments, the machine operating conditions include a heating load, a cooling load, or an electrical load served by the machine.

In some embodiments, the machine learning model generates the condition scores using logistic regression, nearest neighbor, a neural network, a random forest, or a support vector machine.

In some embodiments, the setpoint is a temperature setpoint, a pressure setpoint, a fan speed setpoint, or a motor speed setpoint.

Another implementation of the present disclosure is a BMS. The BMS includes an analytics application configured to receive a vibration dataset associated with a machine controlled by the BMS. The vibration dataset includes machine metadata, machine operating conditions, and one or more time waveforms. The analytics application is further configured to assemble a feature vector comprising one or more features of the vibration dataset for input to a machine learning model. The machine learning model is associated with a component of the machine. The analytics application is further configured to apply the feature vector to the machine learning model in order to generate a condition score for the component. The analytics application is further configured to schedule a maintenance event for the machine or change a setpoint associated with the machine depending on the condition score.

In some embodiments, each of the time waveforms is associated with a physical point on the machine, and the analytics application is further configured to calculate a fast Fourier transform (FFT) of each of the time waveforms in order to determine a machine speed.

In some embodiments, the component is a motor shaft, a bearing, or a fan and wherein the machine is a chiller, a boiler, an air handling unit, or a variable air volume (VAV) unit.

In some embodiments, the machine metadata includes a machine type, a machine model, a gear ratio, or a location of the machine.

In some embodiments, the machine operating conditions include a heating load, a cooling load, or an electrical load served by the machine.

In some embodiments, vibration data contained in the vibration dataset is collected using a triaxial accelerometer.

In some embodiments, the machine learning model generates the condition scores using logistic regression, nearest neighbor, a neural network, a random forest, or a support vector machine.

Yet another implementation of the present disclosure is a method performed by a BMS. The method includes receiving a vibration dataset associated with a machine controlled by the BMS. The vibration dataset includes machine metadata, machine operating conditions, and one or more time waveforms. The method further includes assembling a feature vector for each of a plurality of machine learning models. Each of the machine learning models is associated with a component of the machine and each of the feature vectors includes one or more features of the vibration dataset. The method further includes applying the feature vectors to the machine learning models in order to generate a condition score for each of the components. The method further includes evaluating the condition score for each of the components in order to generate an aggregate condition score associated with the machine. The method further includes scheduling a maintenance event for the machine or changing a setpoint associated with the machine depending on the component condition scores or the aggregate condition score.

In some embodiments, the machine is a chiller and the components include a motor shaft and one or more bearings.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a building management system with automated analysis of vibration data is shown, according to various embodiments. The BMS can include an analytics application configured to receive vibration data from various types of HVAC equipment. The analytics application can then extract various features from the vibration data in order to assemble a feature vector for input to one or more machine learning models. The machine learning models can use advanced mathematical approaches to assess the vibration data in accordance with knowledge of historical data and patterns. The analytics application can include separate machine learning models for different components of building equipment such as motor shafts, bearings, compressors, and fans associated with chillers, boilers, and air handling units. For example, the analytics application can assess the performance and condition of the motor shaft of a chiller using knowledge of data and patterns collected over time from thousands of similar chillers. The analytics application can be configured to output condition scores and other data of interest that can be accessed by analysts and technicians through the BMS. In addition, the analytics application can automatically schedule maintenance events and control the building equipment (e.g., by changing setpoints) depending on the outcome of the analytics.

This approach to vibration data analytics provides several benefits and advantages associated with the BMS. For example, previous approaches have required manual initiation of the analytics process. In addition, these previous approaches have not used large amounts of historical data to fine-tune advanced building equipment models used to assess vibration data. Instead, they simply use rules-based approaches in order to detect problems. The automated analytics functionality described in the present disclosure drives increased insight, improved performance, longer lifetime, and efficient maintenance associated with building assets to name just a few examples.

Building Management System

Figure 1:
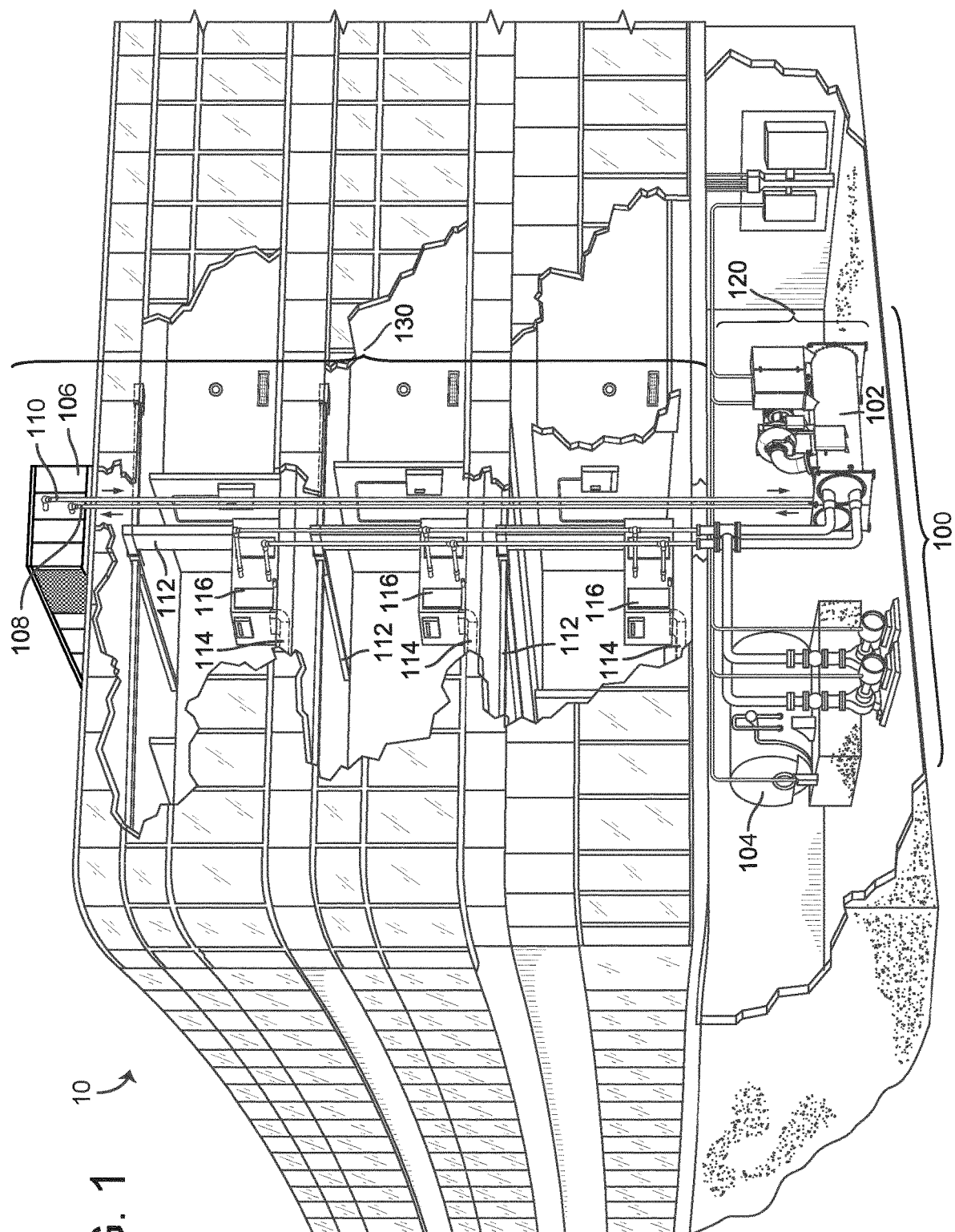
FIG. 1 is a drawing of a building equipped with a building management system (BMS) and a HVAC system, according to some embodiments.

Referring now to FIGS. 1-4, an example building management system (BMS) and HVAC system in which the systems and methods of the present disclosure can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An example waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
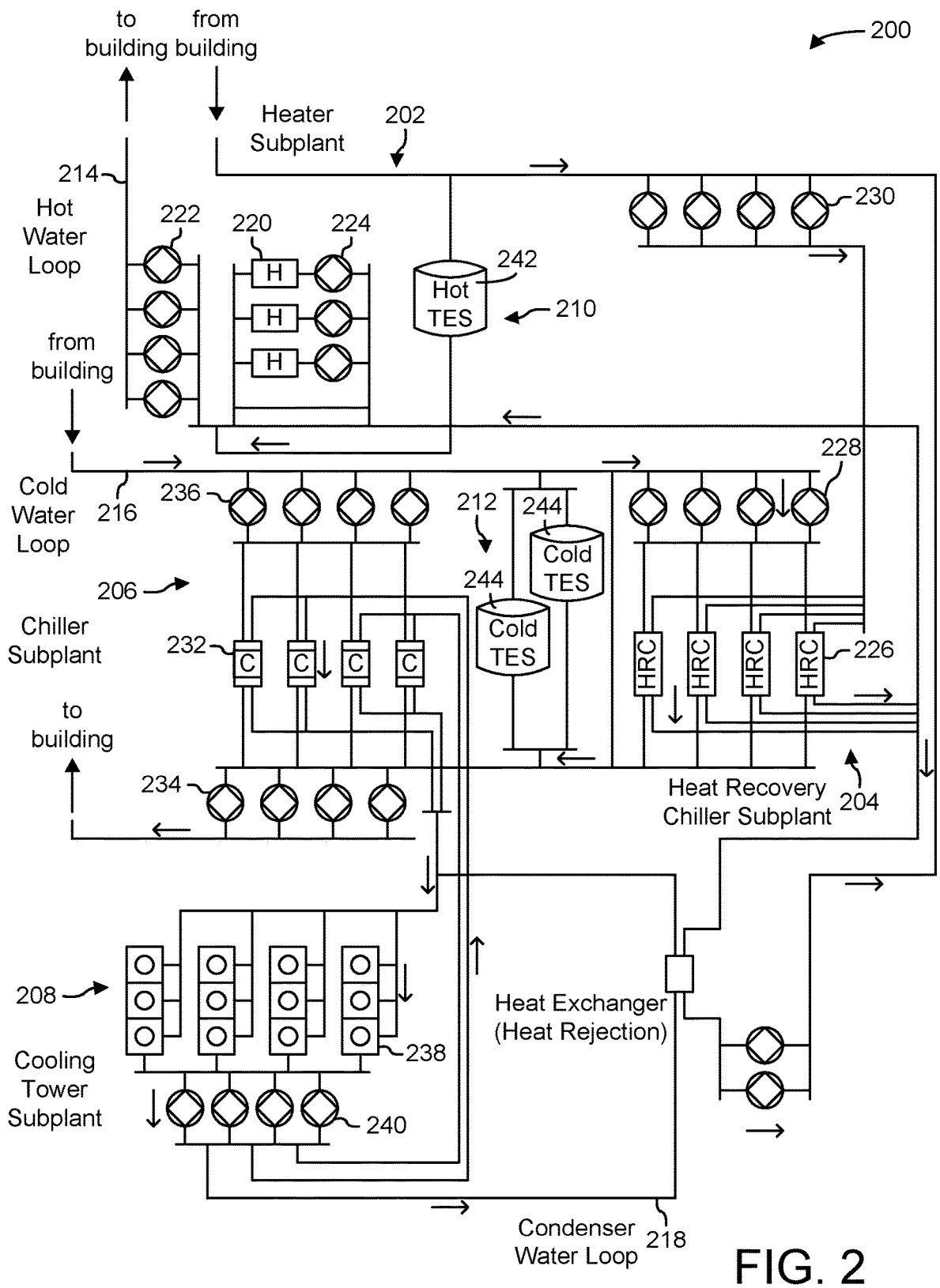
FIG. 2 is a schematic of a waterside system which can be used as part of the HVAC system of FIG. 1, according to some embodiments.

Referring now to FIG. 2, a block diagram of a waterside system 200 is shown, according to an example embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
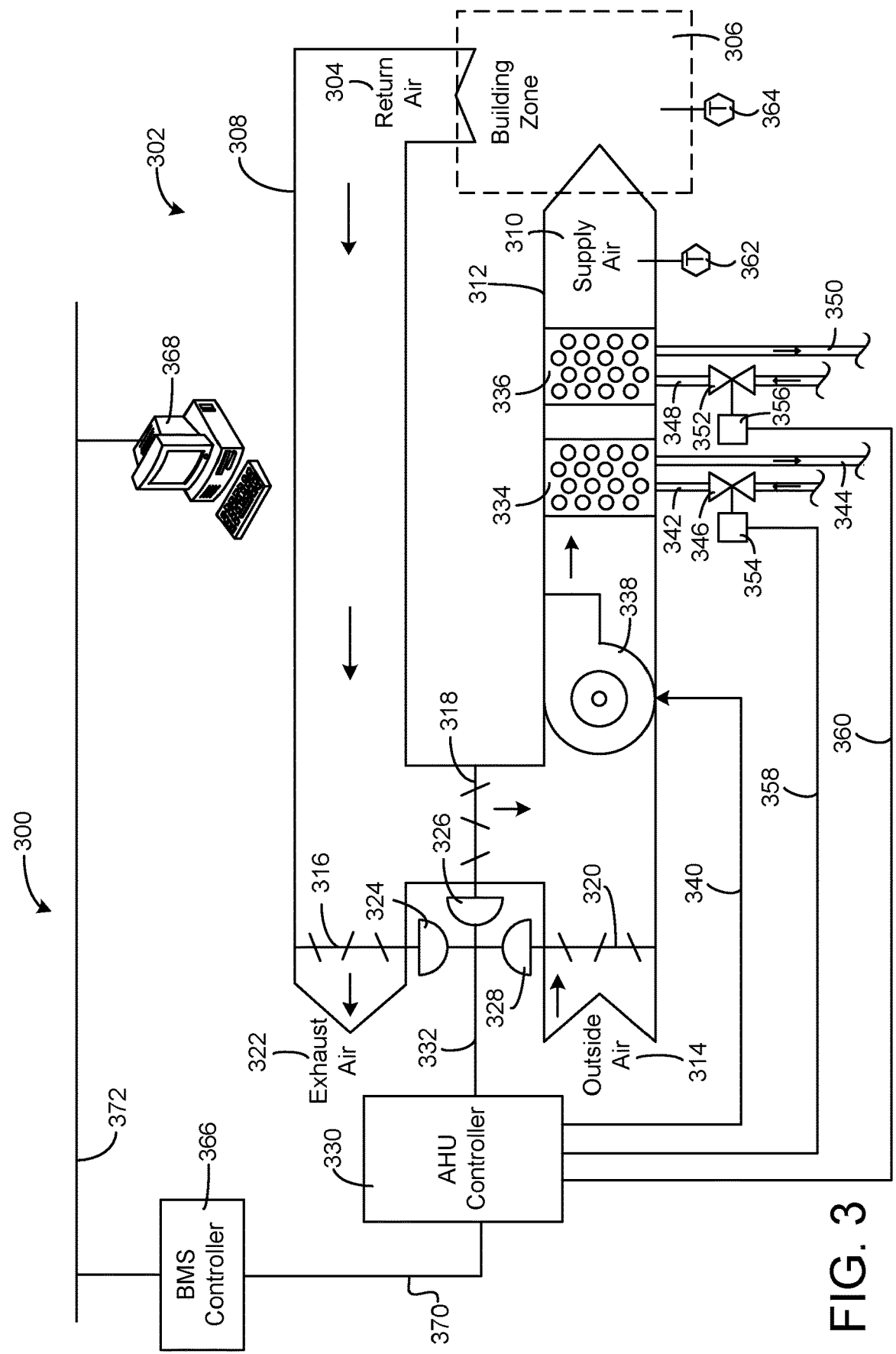
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
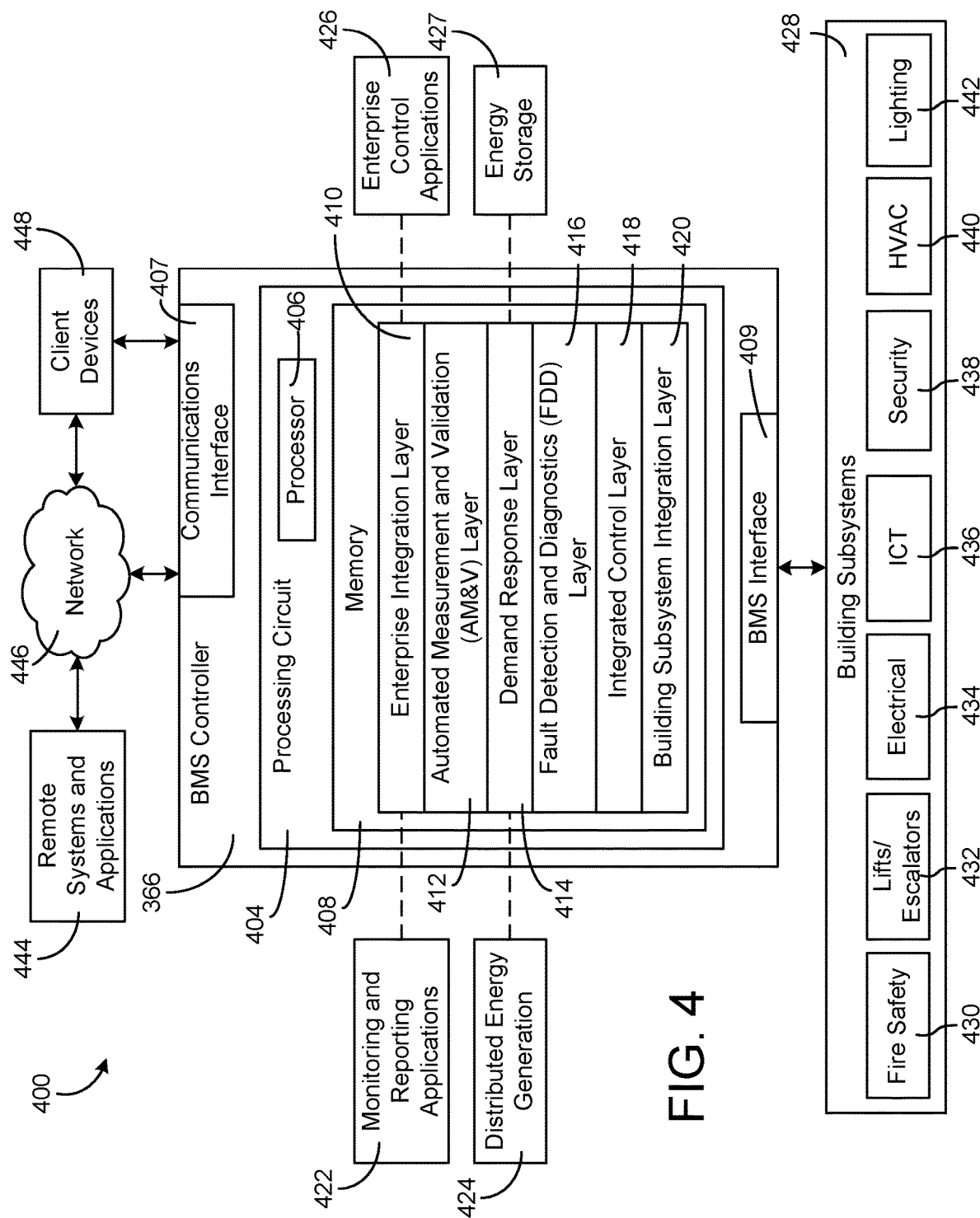
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems

428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Chiller Assembly

Figure 5:
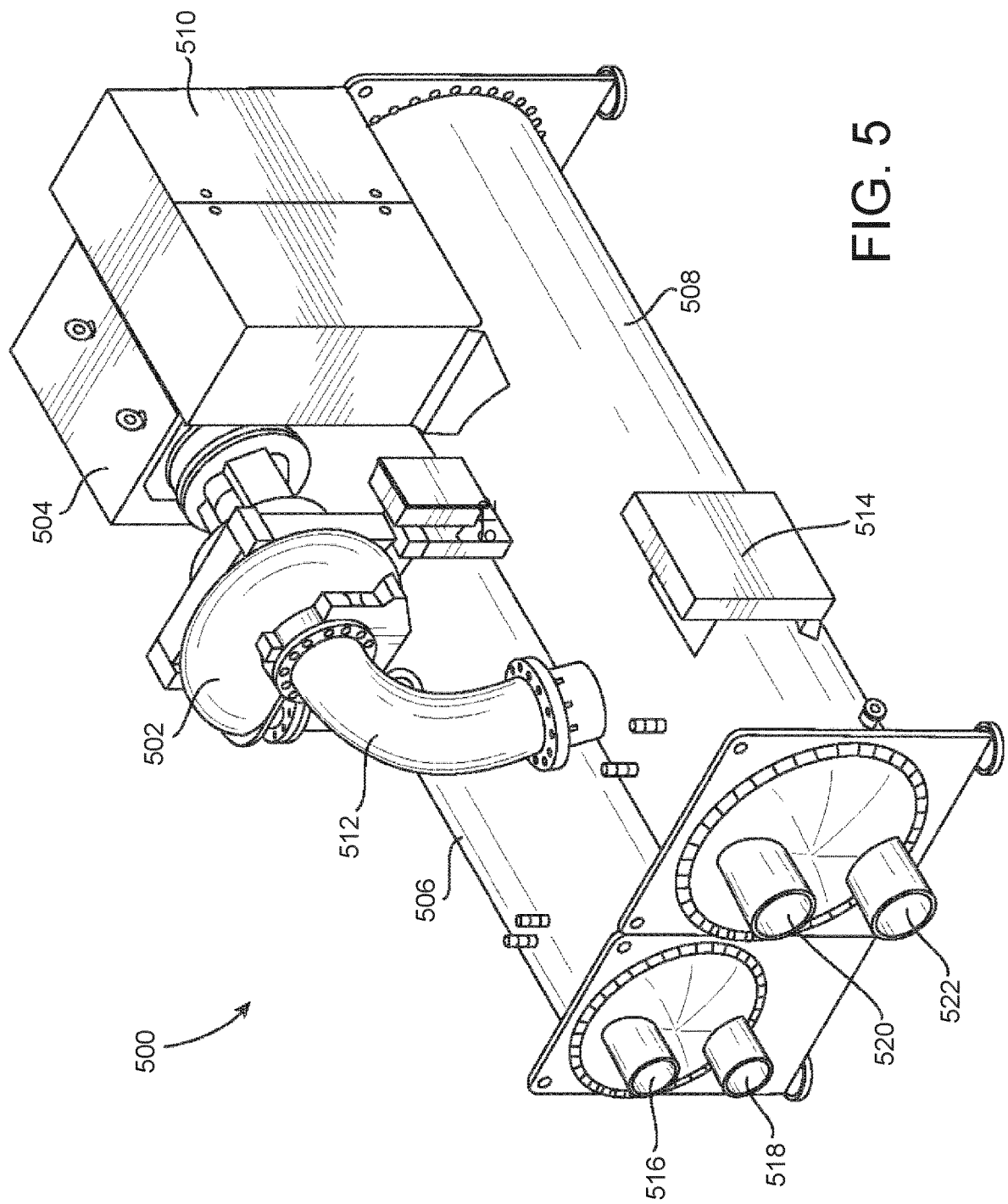
FIG. 5 is a drawing of a chiller assembly associated with the HVAC system of FIG. 1, according to some embodiments.

Turning now to FIG. 5, an example implementation of a chiller assembly 500 is shown, according to some embodiments. Chiller assembly 500 may be identical or nearly identical to chiller 102 described above. Chiller assembly 500 is shown to include a compressor 502 driven by a motor 504, a condenser 506, and an evaporator 508. A refrigerant can be circulated through chiller assembly 500 in a vapor compression cycle or an absorption refrigeration cycle. The refrigerant can be a low pressure refrigerant with an operating pressure less than 400 kPa, for example. Chiller assembly 500 can also include a control panel 514 configured to control operation of the vapor compression cycle within chiller assembly 500. Control panel 514 may be connected to a variety of sensors (e.g., pressure sensors, temperature sensors) and an electronic network (e.g., network 446) in order to communicate a variety of data related to maintenance, analytics, performance, etc. The sensors may additionally or alternatively communicate directly with a controller (e.g., BMS controller 366) and/or BMS 400.

Motor 504 can be powered by a variable speed drive (VSD) 510. In some embodiments, VSD 510 receives alternating current (AC) power having a fixed line voltage and fixed line frequency from an AC power source (not shown) and provides power having a variable voltage and frequency to motor 504. Motor 504 can be any type of electric motor that can be powered by VSD 510. For example, motor 504 can be a high speed induction motor. Compressor 502 can be driven by motor 504 to compress a refrigerant vapor received from evaporator 508 through a suction line 512. For example, compressor 502 can include an impeller comprising a plurality of blades configured to rotate at a high speed in order to compress refrigerant vapor. Compressor 502 may then delivers compressed refrigerant vapor to condenser 506 through a discharge line. Compressor 502 can be a centrifugal compressor, a screw compressor, a scroll compressor, a turbine compressor, or any other type of suitable compressor.

Evaporator 508 can include an internal tube bundle (not shown), a supply line 520, and a return line 522 for supplying and removing a process fluid to the internal tube bundle. Supply line 520 and return line 522 can be in fluid communication with a component within an HVAC system (e.g., air handler 106) via conduits that circulate the process fluid. In some embodiments, the process fluid is a chilled liquid for cooling a building and can be, but is not limited to, water, ethylene glycol, calcium chloride brine, sodium chloride brine, or any other suitable liquid. Evaporator 508 can be configured to lower the temperature of the process fluid as the process fluid passes through the tube bundle of evaporator 508 and exchanges heat with the refrigerant. Refrigerant vapor is formed in evaporator 508 by the refrigerant liquid delivered to the evaporator 508 exchanging heat with the process fluid and undergoing a phase change to refrigerant vapor.

Refrigerant vapor delivered by compressor 502 to condenser 506 transfers heat to a fluid. Refrigerant vapor condenses to refrigerant liquid in condenser 506 as a result of heat transfer with the fluid. The refrigerant liquid from condenser 506 can flow through an expansion device and be returned to evaporator 508 to complete the refrigerant cycle of the chiller assembly 500. Condenser 506 includes a supply line 516 and a return line 518 for circulating fluid between the condenser 506 and an external component of the HVAC system (e.g., a cooling tower). Fluid supplied to condenser 506 via return line 518 can exchange heat with the refrigerant in condenser 506 and can be removed from the condenser 506 via supply line 516 to complete the cycle. The fluid circulating through the condenser 506 can be water or any other suitable liquid.

HVAC Equipment Vibration Data Analytics

Figure 6:
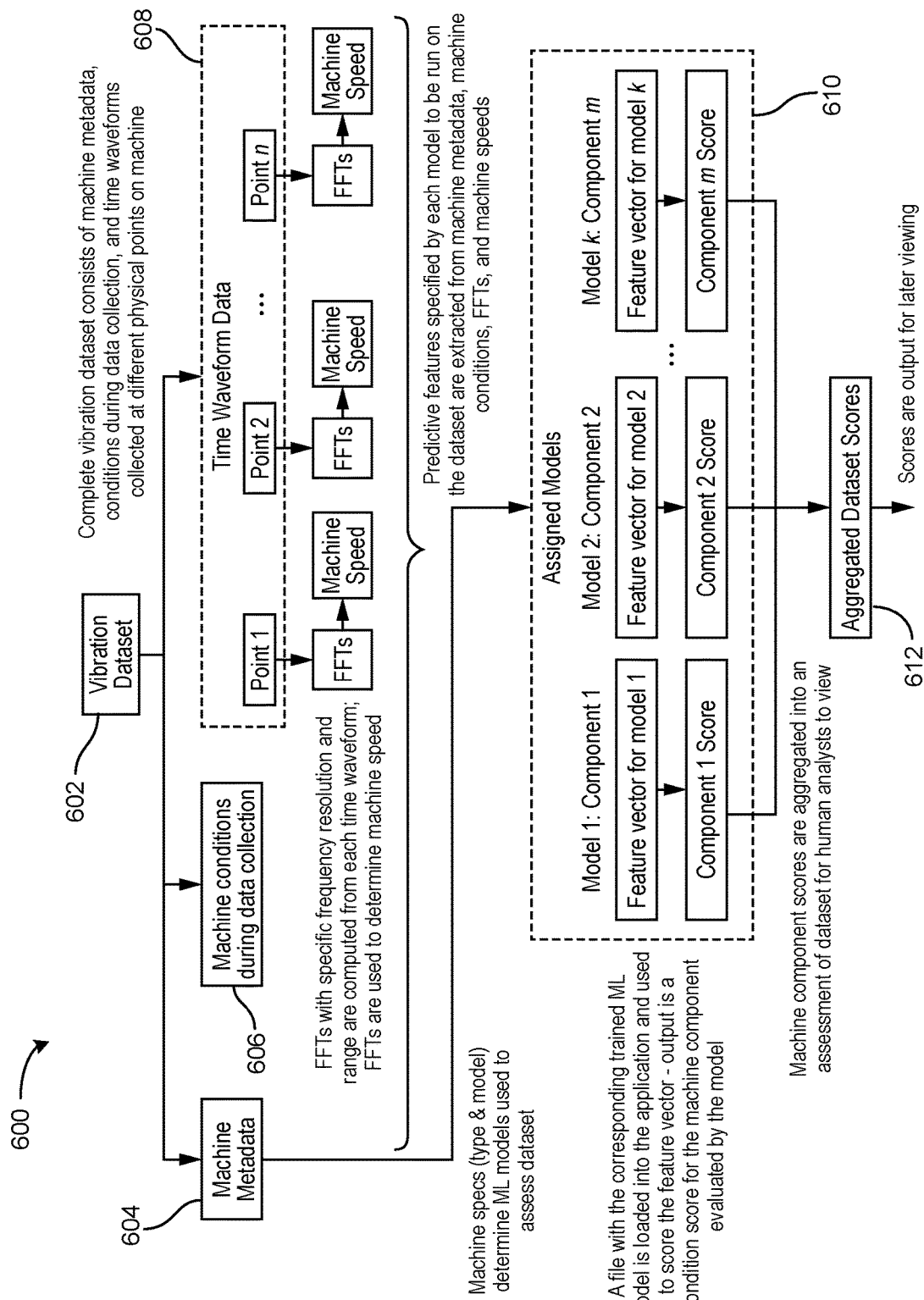
FIG. 6 is a block diagram of an automated analytics flow associated with the BMS of FIG. 4, according to some embodiments.

Referring now to FIG. 6, an automated analytics flow 600 is shown, according to some embodiments. Analytics flow 600 can be performed by an analytics application associated with BMS 400, for example. The analytics application can be configured to receive data, run analytics on the data, and output condition scores based on the analytics. The condition scores can easily be viewed by analysts and other personnel seeking to monitor and maintain efficient operation of building equipment. The analytics application can be configured to automatically schedule maintenance events and change setpoints associated with building equipment depending on results of the analytics.

Analytics flow 600 is shown to include a vibration dataset 602. In some embodiments, vibration dataset 602 corresponds to a single machine and a single data collection event. For example, a technician can be instructed to collect and upload vibration data from chiller assembly 500 once per week, resulting in a new vibration dataset 602 for each collection. A technician can upload the vibration data to cloud storage (e.g., via network 446) where it can be accessed by a variety of different systems and applications. Data contained in vibration dataset 602 can also be collected from sensors permanently mounted on a machine. Vibration dataset 602 can include machine metadata 604, machine conditions 606, and time waveform data 608.

Machine metadata 604 can contain useful information about a machine such as the type, model, gear ratio, and location of the machine. For example, machine metadata 604 can demonstrate that vibration dataset 602 is associated with a YK Chiller (i.e., type=chiller, model=YK) located in the state of Arizona. Machine conditions 606 can include information about the operation of a machine at the time of data collection. For example, machine conditions 606 can include a building load (e.g., tons of cooling) served by chiller assembly 500 at the time of data collection. This information can be taken into consideration during an analytics process in order to generate a more accurate feature vector and condition score.

Time waveform data 608 can be collected at different points on a machine. In some embodiments, time waveform data 608 consists of 9-12 time waves corresponding to 3-4 different points (e.g., motor shaft) on a machine. For example, if the machine is chiller assembly 500, time waveform data 608 can include data collected from various points around compressor 502 and motor 504. Time waveform data 608 can contain accelerometer readings collected in axial, horizontal, and vertical orientations (i.e., triaxial). The accelerometer can include sensors (e.g., piezoelectric), signal conditioning circuitry, and any other components that may be used to measure vibration at different points on a machine.

In some embodiments, time waveform data 608 contains a series of time stamps with corresponding accelerometer readings. The time domain vibration data can be converted to the frequency domain using fast Fourier transform (FFT) calculations. An FFT calculation can be performed according to frequency resolutions or ranges specified by various machine learning models used in the analytics process. A specific type of building equipment can have an associated set of rules used to convert signal characteristics in the frequency domain to an associated machine speed (e.g., rotations per minute). The rules can be developed by analysts that work with the equipment on a consistent basis. FFT and machine speed calculations can be performed for each point in time waveform 608.

Analytics flow 600 is also shown to include a plurality of machine learning models 610. As mentioned above, machine metadata 604 can be used to determine which of models 610 are appropriate to analyze vibration dataset 602. Models 610 can include equipment-specific models (e.g., chiller, boiler), type-specific models (e.g., YK chiller, YZ chiller), and generalized models (e.g., ball bearing model for all types of centrifugal chillers), for example. Models 610 can also be categorized as supervised models if data is labeled or unsupervised if data is not labeled. Models 610 can receive a feature vector comprising data of interest (e.g., features) from vibration dataset 602 as input. The feature vector can assembled according to various parameters of the associated model. For example, a feature vector assembled for input to a bearing-specific machine learning model can contain relevant time domain and frequency domain characteristics collected from a point on chiller assembly 500 associated with one or more bearings. Each machine learning model defines the features required for the feature vector and how these features can be extracted from the raw data contained in a vibration dataset 602.

Individual machine learning models can be designed to output a condition score for a certain component on the machine. For example, machine learning model 2 (e.g., chiller motor shaft model) may be used to evaluate component 2 (e.g., shaft of motor 504 of chiller assembly 500) in order to determine if a motor shaft is in an acceptable operating condition. Each machine learning model can be trained with historical data in order to make the evaluation of an input feature vector more accurate and effective. As more data is collected and associated with a specific component, machine learning models 610 can be retrained with the new data in order to achieve even better performance.

Analytics flow 600 is shown to include aggregated dataset scores 612. In some embodiments, multiple models may be used to evaluate the same component on a machine. These component scores can be aggregated into a single score for the component. For example, vibration data from a motor shaft may assembled into three different feature vectors (e.g., to assess horizontal, axial, and vertical orientations) for input to three different machine learning models. In this case, an unacceptable score from one of the three models could result in an aggregated unacceptable score for the motor shaft. An aggregate condition score can also be assembled for the machine as a whole. The aggregated scores can be automatically uploaded to cloud storage for viewing by analysts. In some embodiments, BMS 400 is configured to schedule maintenance or change one or more setpoints associated with building equipment depending on the condition scores.

Figure 7:
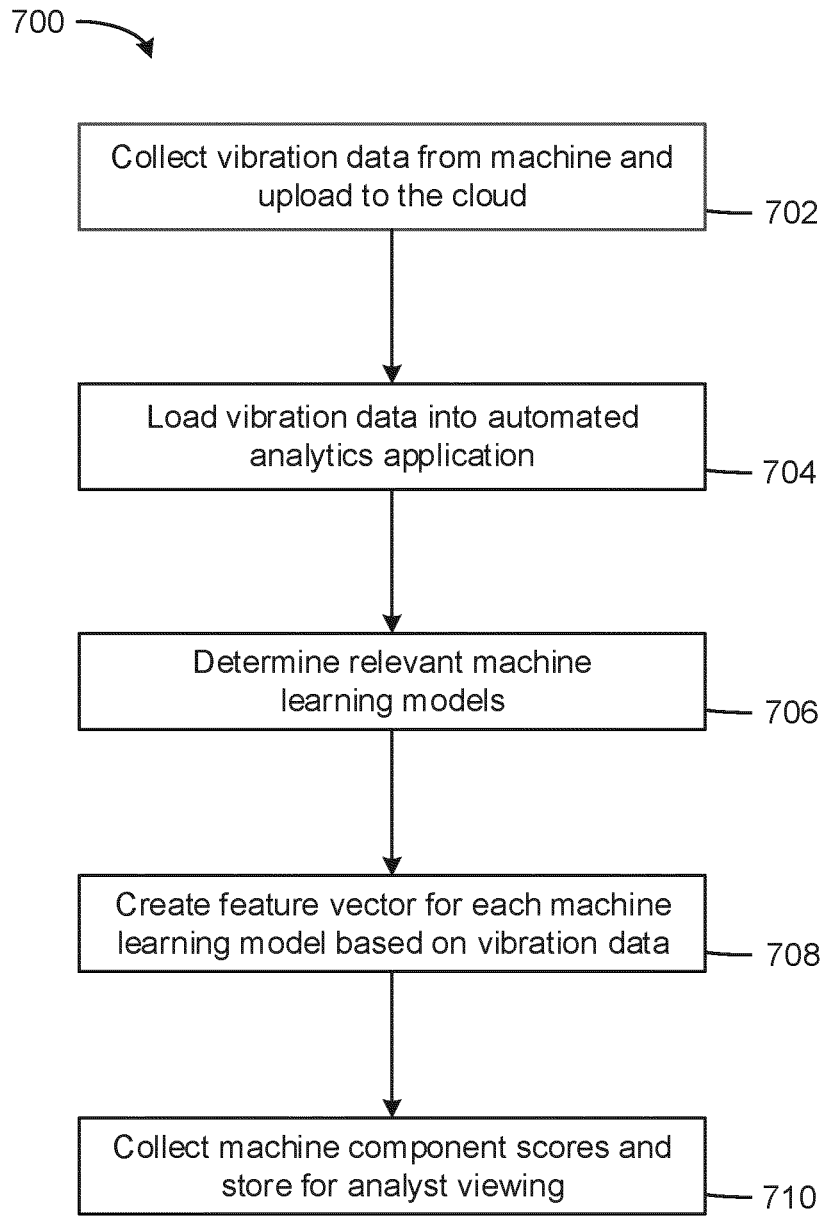
FIG. 7 is a flow diagram providing an overview of an automated analytics process associated with the BMS of FIG. 4, according to some embodiments.

Referring now to FIG. 7, a flow diagram of an automated analytics process 700 is shown, according to some embodiments. Process 700 can be performed in part by an automated analytics application associated with BMS 400. Process 700 provides an overview of an automated vibration data analysis process associated with BMS 400. Process 700 allows BMS 400 to automatically process HVAC equipment vibration data and determine a condition score for a variety of machine components. The use of machine learning models 610 results in improved accuracy and effectiveness of the analytics by making use of historical data in order to discover patterns and other common occurrences associated with building equipment. The analytics can be used to automatically schedule maintenance or adjust setpoints associated with building equipment, for example.

Process 700 is shown to include collecting data from a machine and uploading the data to cloud storage (step 702).

For example, vibration dataset 602 can be collected by a technician that works with HVAC equipment on a regular basis. In some embodiments, the technician uploads accelerometer readings from sensitive components on a machine (e.g., motor shaft of a chiller). The data can be collected using a triaxial accelerometer, for example. Vibration dataset 602 can be collected by a technician in the field and/or can be collected from sensors permanently mounted on a machine. The data uploaded in step 702 can be used to gain insight into the operation of building equipment and detect any potential problems or inefficiencies.

Process 700 is shown to include loading data into an analytics application (step 704). The analytics application can be integrated with BMS 400 and can use a variety of approaches to analyze vibration dataset 602. For example, HVAC equipment vibration data collected in step 702 can be loaded into the analytics application for preparation and evaluation by one or more machine learning models 610. The automated analytics application can access historical data associated with building equipment in order to train models 610 and discover vibration patterns.

Process 700 is shown to include determining relevant machine learning models (step 706). The relevant machine learning models can be determined in part based on machine metadata 604. For example, if machine metadata 604 indicates that vibration dataset 602 is associated with chiller assembly 500, the automated analytics application can determine that one or more of models 610 can be used to analyze performance of motor 504 and compressor 502. As mentioned above, each of models 610 can be associated with a specific component of a specific machine, a generic component associated with multiple types of similar machines, or any other type of machine learning model that can effectively evaluate vibration data from HVAC equipment.

Process 700 is shown to include assembling a feature vector for each machine learning model based on vibration data (step 708). Each of the relevant models determined in step 706 can define various features of vibration dataset 602 that should be included in the feature vector. Time waveform data 608 can be converted to the frequency domain using a FFT calculation. The FFT calculation can be used to achieve specific frequency resolutions and ranges. Certain features found in the frequency domain data as well as the raw time domain data can be indicative of normal or abnormal function of a machine component. These features can be used to assemble a feature vector for evaluation by selected machine learning models 610.

Process 700 is shown to include collecting and storing machine component scores for analyst viewing (step 710). As mentioned above, each machine learning model contained in or accessed by the analytics application of BMS 400 can be trained with historical data used to predict component failure. Each feature vector for each model can be assigned a component score indicating whether the component is in an acceptable or unacceptable condition (e.g., binary). In some embodiments, the component score can also be a numerical score (e.g., 1-100), a letter score (e.g., A, B, C, etc.), or any other method of scoring a condition of a physical component of building equipment. In some embodiments, more than one model is used to score the same component, in which case the scores for that component can be aggregated into a single score. All of the component scores calculated by the analytics application can be sent to cloud storage.

Figure 8:
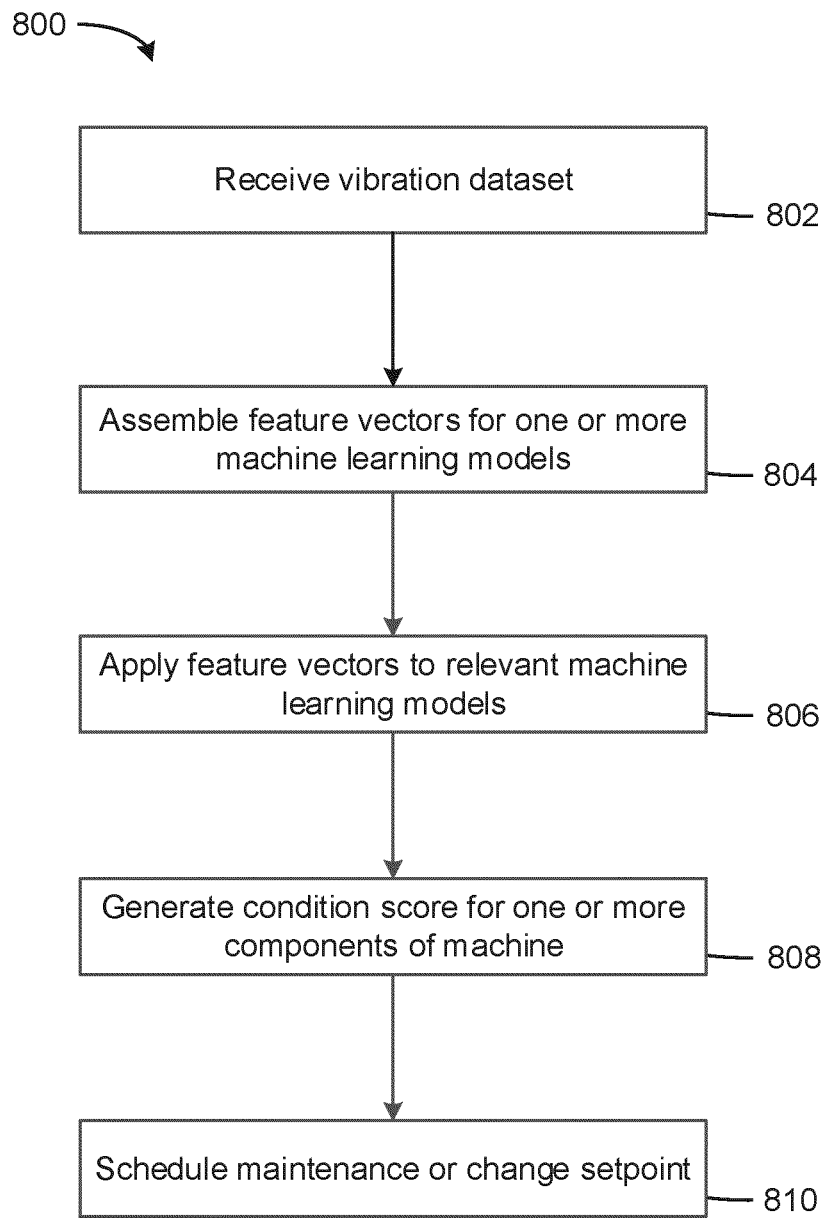
FIG. 8 is a flow diagram of an automated analytics process associated with the BMS of FIG. 4, according to some embodiments.

Referring now to FIG. 8, a flow diagram of an automated analytics process 800 is shown, according to some embodiments. Process 800 can be performed by an analytics application associated with BMS 400. Process 800 allows BMS 400 to automatically process HVAC equipment vibration data and determine a condition score for a variety of machine components. For example, the analytics application can be configured to analyze vibration data from chiller assembly 500 in order to provide reporting and monitoring functionality. Further, BMS 400 can resolve problems detected through the analytics by operating building equipment or scheduling maintenance.

Process 800 is shown to include receiving a vibration dataset (step 802). For example, the analytics application associated with BMS 400 can receive vibration dataset 602 as described above. The dataset can include machine metadata 604, machine conditions 606, and time waveforms 608. The analytics application can receive vibration dataset 602 from a variety of equipment controlled by BMS 400. For example, dataset 602 can be associated with chiller assembly 500, boiler 104, AHU 106, VAV units 116, or any equipment described above or otherwise associated with BMS 400.

Process 800 is shown to include assembling feature vectors for one or more machine learning models (step 804). For example, the analytics application can be configured to extract various features from vibration dataset 602. Features can include FFT calculations (e.g., frequency domain data), signal envelope or cepstrum (e.g., inverse Fourier transform) calculations, time domain data (e.g., raw signals, statistical measures), frequency-time data (e.g., spectrograms), machine speeds, fundamental frequencies (e.g., calculated from FFT spectra), machine specs (e.g., line frequency, gear ratio, number of impeller blades), runtime data (e.g., machine load), and historical data. Spectrograms can be constructed for each point in time waveform 508. An image of each of these spectrograms can then be generated and analyzed by a convolutional neural network for anomaly detection or image classification, for example. In addition, labels can be applied to vibration dataset 602. These labels can be obtained from historical data and can include machine conditions (e.g., alert condition), component conditions (e.g., motor 504 in alarm condition), root cause faults (e.g., based on maintenance records), and appropriate maintenance procedures, for example.

As an example of assembling a feature vector as performed in step 804, consider a machine learning model 610 used to evaluate the condition of motor 504. The analytics application can be configured to convert time domain data from the drive end and non-drive end of motor 504 as well as time domain data from compressor 504 into the frequency domain using an FFT calculation. If the time domain data is collected using a triaxial accelerometer, the result of the FFT calculation is nine different spectra (e.g., 3 points, 3 orientations each). The FFT calculation can be performed over a relatively small frequency range and a relatively high resolution in order to assess abnormal behavior of motor 504. Machine specifications (e.g., as indicated by type of machine found in metadata 604) can then be used to estimate the operating frequency and amplitude (e.g., speed) of motor 504. In some embodiments, each of the nine spectra are scaled by the corresponding motor speed in order to allow for comparison between machines running at different speeds and standardization of the location of certain spectral features (e.g., fundamental peak corresponds to 1.0 on the frequency axis). In some embodiments, the frequency domain data is divided into bins (e.g., specified frequency ranges) and each bin value is taken as the maximum amplitude found within the bin. In addition, amplitudes at the fundamental frequency as well as various harmonic frequencies can be discovered from the frequency domain data (e.g., through FFT bin interpolation). As a result, the feature vector may include six amplitude values (e.g., fundamental frequency and second though sixth harmonics) for all nine spectra as well as specifications associated with chiller assembly 500 as indicated by metadata 604. In some embodiments, dimensionality reduction is performed on a feature vector using principal component analysis (PCA) or an auto encoder.

Process 800 is shown to include inputting the feature vectors into the relevant machine learning models (step 806). For example, each of the feature vectors assembled in step 804 can be input to the appropriate machine learning model 610. Each of models 610 can be trained using historical data and assessments from human HVAC equipment analysts. Machine learning algorithms implemented in models 610 can include random forests, logistic regression, neural networks, support vector machines, and other advanced algorithms. These algorithms can detect patterns and dynamically adjust various parameters in order to generate more accurate results than conventional rules-based approaches.

Process 800 is shown to include generating condition scores for one or more components of the machine (step 808). For example, if the machine is chiller assembly 500, the output of one or more models 610 can be used to generate condition scores for motor 504 and compressor 502. In addition, a condition score can be generated for chiller assembly 500 as a whole. The output of models 610 can include predicted conditions of a component (e.g., probability of problem associated with bearings), suggested maintenance actions, root causes of poor condition scores, and any abnormal regions of the frequency domain data. In some embodiments, models 610 are tuned to favor either false positives or false negatives depending on how the model output is used. In addition, two or more of models 610 can be "chained" together so that multiple models are required to generate a valid output.

Process 800 is shown to include scheduling maintenance or changing a setpoint associated with building equipment (step 810). For example, if the condition scores generated in step 808 indicate a high probability that chiller assembly 500 will experience a safety shutdown, the analytics application can be configured to schedule a maintenance event within BMS 400. As a result, technicians may be able to service chiller assembly 500 before the shutdown occurs. The analytics application can also be configured to include an indication of suggested maintenance activities as part of the maintenance event. In some embodiments, one or more models 610 are trained with historical data (e.g., maintenance records) and used to generate the suggested maintenance activities. In addition, the analytics application can be configured to dynamically adjust a temperature setpoint, a pressure setpoint, a flow setpoint, etc. in order to reduce capacity demand of chiller assembly 500.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method performed by a Building Management System (BMS) comprising:
   training a plurality of machine learning models based on historical data relating to one or more machines, the plurality of machine learning models corresponding to components of the one or more machines;
   receiving a vibration dataset associated with a machine controlled by the BMS, the vibration dataset including machine metadata, machine operating conditions, and one or more time waveforms;
   assembling a feature vector comprising one or more features of the vibration dataset for input to a machine learning model of the plurality of machine learning models, wherein the machine learning model is selected based at least in part upon an identity of a component of the machine, and wherein the machine learning model defines the one or more features to extract from the vibration dataset;
   applying the feature vector to the machine learning model in order to generate a condition score for the component; and generating a suggested maintenance action for the machine or changing a setpoint associated with the machine depending on the condition score.

2. The method of claim 1, wherein each of the time waveforms is associated with a physical point on the machine.

3. The method of claim 1, further comprising calculating a fast Fourier transform (FFT) of each of the time waveforms.

4. The method of claim 3, further comprising calculating a machine speed based on frequency domain information obtained from the FFT.

5. The method of claim 1, wherein the component is a motor shaft, a bearing, or a fan.

6. The method of claim 1, wherein the machine is a chiller, a boiler, an air handling unit (AHU), or a variable air volume (VAV) unit.

7. The method of claim 1, wherein vibration data contained in the vibration dataset is collected using a triaxial accelerometer.

8. The method of claim 1, wherein the machine metadata includes a machine type, a machine model, a gear ratio, or a location of the machine.

9. The method of claim 1, wherein the machine operating conditions include a heating load, a cooling load, or an electrical load served by the machine.

10. The method of claim 1, wherein the machine learning model generates the condition scores using logistic regression, nearest neighbor, a neural network, a random forest, or a support vector machine.

11. The method of claim 1, wherein the setpoint is a temperature setpoint, a pressure setpoint, a fan speed setpoint, or a motor speed setpoint.

12. The method of claim 1, wherein the machine learning model is selected based at least in part upon the identity of the machine and the identity of the component of the machine.

13. The method of claim 1, wherein the one or more machines are a same machine type as the machine controlled by the BMS.

14. A Building Management System (BMS) comprising:
a memory having instructions stored thereon that, when executed by one or more processors, cause the one or more processors to:
generate a plurality of machine learning models corresponding to components of one or more machines, the plurality of machine learning models trained using historical data of the one or more machines;
receive a vibration dataset associated with a machine controlled by the BMS, the vibration dataset including machine metadata, machine operating conditions, and one or more time waveforms;
select a machine learning model from among the plurality of machine learning models based at least in part on an identity of a component of the machine;
assemble a feature vector comprising one or more features of the vibration dataset for input to the machine learning model, wherein the machine learning model is associated with the component of the machine, and wherein the machine learning model defines the one or more features to extract from the vibration dataset;
apply the feature vector to the machine learning model in order to generate a condition score for the component; and
generate a suggested maintenance action for the machine or change a setpoint associated with the machine depending on the condition score.

15. The BMS of claim 14, wherein each of the time waveforms is associated with a physical point on the machine, and wherein the analytics application is further configured to calculate a fast Fourier transform (FFT) of each of the time waveforms in order to determine a machine speed.

16. The BMS of claim 14, wherein the component is a motor shaft, a bearing, or a fan and wherein the machine is a chiller, a boiler, an air handling unit, or a variable air volume (VAV) unit.

17. The BMS of claim 14, wherein the machine metadata includes a machine type, a machine model, a gear ratio, or a location of the machine.

18. The BMS of claim 14, wherein the machine operating conditions include a heating load, a cooling load, or an electrical load served by the machine.

19. The BMS of claim 14, wherein vibration data contained in the vibration dataset is collected using a triaxial accelerometer.

20. The BMS of claim 14, wherein the machine learning model generates the condition scores using logistic regression, nearest neighbor, a neural network, a random forest, or a support vector machine.

21. The BMS of claim 14, wherein the one or more processors select the machine learning model based at least in part upon the identity of the machine and the identity of the component of the machine.

22. A method performed by a Building Management System (BMS) comprising:
training a plurality of machine learning models based on historical data relating to one or more machines, the plurality of machine learning models corresponding to components of the one or more machines;
receiving a vibration dataset associated with a machine controlled by the BMS, the vibration dataset including machine metadata, machine operating conditions, and one or more time waveforms;
assembling a feature vector for each of the plurality of machine learning models, wherein each of the machine learning models is selected based at least in part upon an identity of a component of the machine, and wherein each of the feature vectors includes one or more features of the vibration dataset, and wherein the machine learning model defines the one or more features to extract from the vibration dataset;
applying the feature vectors to the machine learning models in order to generate a condition score for each of the components;
evaluating the condition score for each of the components in order to generate an aggregate condition score associated with the machine; and
generating a suggested maintenance action for the machine or changing a setpoint associated with the machine depending on the component condition scores or the aggregate condition score.

23. The method of claim 22, wherein the machine is a chiller and the components include a motor shaft and one or more bearings.

24. The method of claim 22, wherein the machine learning model is selected based at least in part upon the identity of the machine and the identity of the component of the machine.

25. The method of claim 22, wherein two or more machine learning models of the plurality of the machine learning models are selected based on at least an identity of a single component of the machine.

* * * * *